(12) United States Patent
Mitra (10) Patent No.: US 10,474,366 B2
(45) Date of Patent: Nov. 12, 2019

(54) NON-VOLATILE STORAGE SYSTEM WITH IN-DRIVE DATA ANALYTICS

(71) Applicant: SANDISK TECHNOLOGIES LLC, Plano, TX (US)

(72) Inventor: Sumanranjan Mitra, Mumbai (IN)

(73) Assignee: SANDISK TECHNOLOGIES LLC, Addison, TX (US)

( * ) Notice: Subject to any disclaimer, the term of this patent is extended or adjusted under 35 U.S.C. 154(b) by 243 days.

(21) Appl. No.: 15/393,130

(22) Filed: Dec. 28, 2016

(65) Prior Publication Data

US 2018/0181304 A1    Jun. 28, 2018

(51) Int. Cl.
*G06F 3/06* (2006.01)

(52) U.S. Cl.
CPC ............ *G06F 3/061* (2013.01); *G06F 3/0679* (2013.01)

(58) Field of Classification Search
CPC ...... G06F 3/061; G06F 3/0625; G06F 3/0626; G06F 3/0629; G06F 3/064; G06F 3/0644; G06F 3/0659; G06F 3/0665; G06F 3/0679; G06F 12/109
See application file for complete search history.

(56) References Cited

U.S. PATENT DOCUMENTS

| | | | |
|---|---|---|---|
| 9,021,189 B2 | 4/2015 | Salessi | |
| 2009/0019208 A1* | 1/2009 | Sanvido | G06F 9/45558 711/2 |
| 2009/0319256 A1* | 12/2009 | Chow | G06F 11/3612 703/26 |
| 2011/0154319 A1* | 6/2011 | Carter-Schwendler | H04L 69/16 718/1 |
| 2011/0314235 A1 | 12/2011 | Kwon | |
| 2013/0097518 A1* | 4/2013 | Pearcy | G06F 9/542 715/741 |
| 2014/0123142 A1* | 5/2014 | Huh | G06F 9/45533 718/1 |
| 2014/0195770 A1* | 7/2014 | Nishtala | G06F 3/0644 711/173 |
| 2015/0379774 A1* | 12/2015 | Trainor | G06F 17/30047 345/633 |
| 2016/0211033 A1* | 7/2016 | Lee | G11C 29/021 |
| 2016/0283139 A1* | 9/2016 | Brooker | G06F 3/0619 |
| 2017/0293425 A1* | 10/2017 | Sethuraman | G06F 3/061 |
| 2018/0210656 A1* | 7/2018 | Sato | G06F 3/06 |

OTHER PUBLICATIONS

Seshadri, et al., "Willow: A User-Programmable SSD," OSDI'14 Proceedings of the 11th USENIX conference on Operating Systems Design and Implementation, Oct. 6, 2014.

(Continued)

*Primary Examiner* — Nanci N Wong
(74) *Attorney, Agent, or Firm* — Vierra Magen Marcus LLP (57) ABSTRACT

A solid state drive (or other non-volatile storage device) includes a plurality of non-volatile storage elements arranged in blocks (or other units). Blocks (or other units) can be individually switched between analytics mode and I/O mode. The SSD (or other non-volatile storage device) performs in-drive data analytics for blocks in analytics mode while blocks in I/O mode are available for concurrent I/O operations.

20 Claims, 10 Drawing Sheets

(56) References Cited

OTHER PUBLICATIONS

De, et al., "Minerva: Accelerating Data Analysis in Next-Generation SSDs," FCCM '13 Proceedings of the 2013 IEEE 21st Annual International Symposium on Field-Programmable Custom Computing Machines, Apr. 28, 2013.
"SSDs for Big Data—Fast Processing Requires High-Performance Storage," Micron Technology, Inc., Mar. 1, 2016.

* cited by examiner

NON-VOLATILE STORAGE SYSTEM WITH IN-DRIVE DATA ANALYTICS

BACKGROUND

A solid state drive ("SSD") is a non-volatile storage device that stores persistent data in solid state based memory. Due to improvements in cost, power and speed, SSD's have become more popular for storing enterprise data or other large sets of data that are often referred to as "Big Data."

Big Data analytics involves running analytical algorithms on large sized unstructured data (on the order of gigabytes, terabytes or higher) to derive information and patterns that help make decisions pertaining to business, security, human behavior, economics, social trends, etc. The data can be super-sized files including text data, video data, voice data, numbers, etc. A typical data analytics program flow involves an analytics application reading a set of files from a hard disk drive ("HDD") or SSD into a host machine's (e.g., an analytics server) memory, running a data analytics algorithm on the 'in memory' data, and utilizing the results for decision making. This approach suffers from the bottleneck of reading huge data sets from storage (e.g., HDD or SSD) into host memory over a storage network ("SAN"). Additionally, the above-described approach for Big Data analytics can be expensive both in terms of host system memory requirements and network usage.

BRIEF DESCRIPTION OF THE DRAWINGS

Like-numbered elements refer to common components in the different figures.

DETAILED DESCRIPTION

In order to reduce the delay in Big Data analytics due to reading the Big Data from the HDD or SDD into the analytics server memory, it is proposed to perform the analytics in-drive, meaning that the analysis of the data is performed inside an SSD. There are several advantages to performing in-drive analytics. First, there will be a reduction in network traffic, which results in faster data analysis and availability of the network for other uses. Second, the analytics server can be a relatively smaller configuration machine with reduced memory size and slower processor, thereby saving cost and power.

To accomplish such in-drive analytics, it is proposed to dynamically switch portions (e.g., blocks or other units of memory) of the SSD between I/O mode and analytics mode In one embodiment, the switching is performed by the server or storage enclosure to which the SSD is attached and/or enclosed. Portions of the SSD in I/O mode can be used to erase, program and read host data (input/output or I/O operations). Data stored in the portions of the SSD in analytics mode can be analyzed as per any Big Data analytics algorithm. This approach is of great value as it precludes the need for an entire SSD to be made unavailable to a server when 'in drive' data analytics is in progress. The benefit is also useful in a virtualized environment when a single physical drive is split between multiple guest operating systems as virtual storage so that locking out all guest operating systems to enable one to perform data analysis is avoided. This proposal allows uninterrupted I/O operations to progress while a subset of SSD blocks will be in the analytics state.

In some embodiment, to allow for customized data analysis, the system allows for the downloading of analytics logic onto the SSD by a host/analytics server in order to utilize the processing power inside the SSD to perform the analytics on the data stored in the SSD. In this manner, an analytics server may trigger analytics on files containing unstructured data (text, video, audio, images, etc.) resident on the SSD. The analytics logic can be software to program a processor or logic to configure FPGAs.

Although many of the example systems discussed herein are SSD's, the technology described herein is not limited to SSD's and can be implemented with other types of storage devices.

Figure 1:
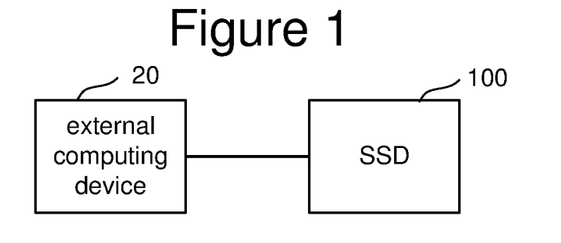
FIG. 1 is a block diagram of a system having a solid state drive.

FIG. 1 is a block diagram of one example of a computing system using a SSD. FIG. 1 shows external computing device 20 connected to SSD 100 by an internal bus, a network, a peripheral port, a HDD interface, a wireless interface, etc. No particular means for communication is required. In some example, standard interfaces such as SAS, SCSI, SATA, or NVMe can be used. External computing device 20 can be an analytics server, application server, web server, other type of server, personal computer, network appliance, etc. Sometimes the computing device connected to a SSD is referred to as a host. External computing device 20 can instruct SSD 100 to switch portions of memory from I/O mode to analytics mode, download software (including firmware) to SSD 100 and instruct SSD 100 to run the software which programs the SSD to perform data analysis on the portions of non-volatile memory in analytics mode while other portions of the SSD's non-volatile memory are in I/O mode and are available for concurrent I/O operations. In this context, "concurrent" is used to indicate that the I/O operations overlap in time with the performance of the data analysis.

Figure 2:
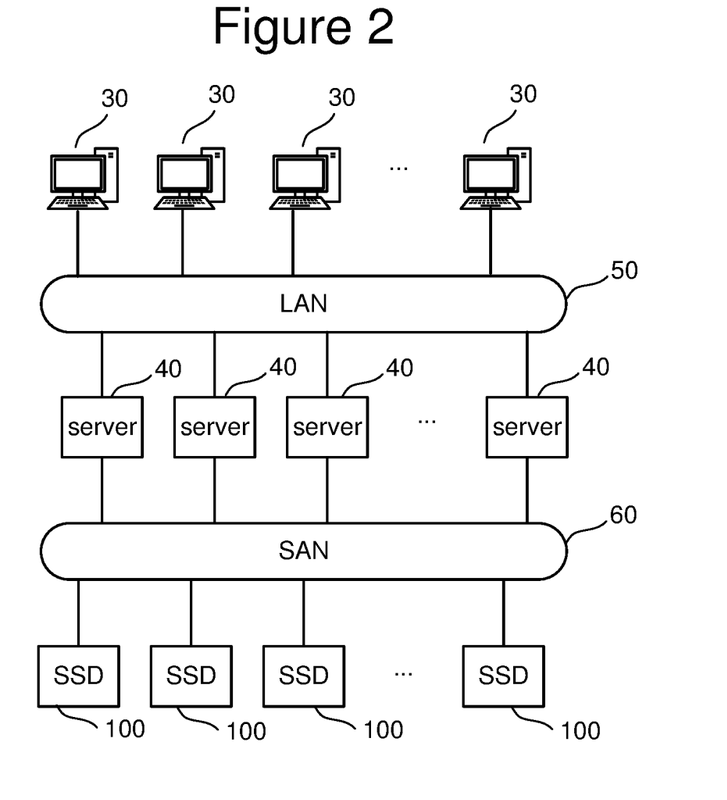
FIG. 2 is a block diagram of a system having using a storage network to access solid state drives.

FIG. 2 is a block diagram of a system having using a storage network to access solid state drives. A plurality of client computers 30 access a plurality of servers 40 via a Local Area Network ("LAN") 50. The client computers can be personal computers, laptop computers, smart phones, mobile computing devices, network appliances, servers, etc. The servers 40 can be analytics servers, application servers, web servers, or other types of servers. No specific type of client computer 30 or server 40 is required. To perform a task assigned by a client computer 30, a server 40 will access data (e.g., "Big Data") on any one or more of SSD's 100 via a Storage Area Network ("SAN") 60. A SAN is a specialized, high speed network that provides block level network access to storage. SANs are typically composed of hosts, switches, storage elements, and storage devices that are interconnected using a variety of technologies, topologies, and protocols. SANs may also span multiple sites. Storage area networks are well known in the art and no particular type of SAN is required for use with the technology proposed herein.

In furtherance of performing a task for a client computer 30, a server 40 can instruct a SSD 100 to switch portions of memory from I/O mode to analytics mode, download software (including firmware) to the SSD 100 and instruct the SSD 100 to run the software which programs the SSD to perform data analysis on the portions of memory in analytics mode while other portions of the SSD's non-volatile memory are in I/O mode and are available for concurrent I/O operations. In some embodiments, any of the SSD's 100 can interact with any of the servers 40. In other embodiments, some SSD's may only interact with a subset of servers.

Figure 3:
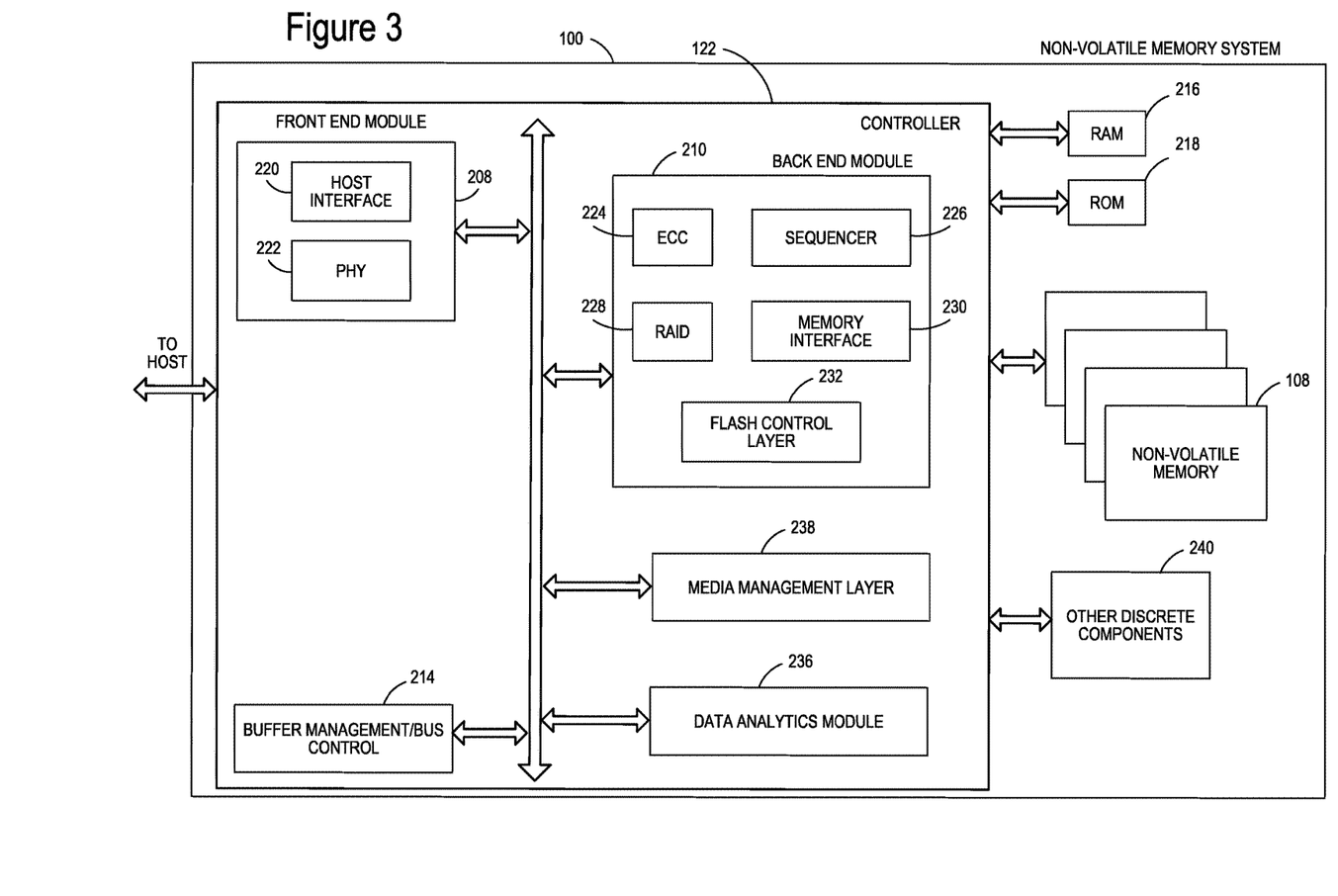
FIG. 3 is a block diagram of one example of a solid state drive.

FIG. 3 is a block diagram of one example of an SSD 100. However, the architecture depicted in FIG. 3 can also be used to implement other types of non-volatile storage devices. SSD 100 includes a controller 122 connected to one or more non-volatile memory die 108. As used herein, for a system that uses non-volatile memory, a controller is a device that manages data stored on the non-volatile memory and communicates with a host, such as an external computing device 20 or a server 40. Controller 122 can have various functionality in addition to the specific functionality described herein. For example, controller 122 can format the non-volatile memory to ensure the memory is operating properly, map out bad memory cells (the physical unit of storage), and allocate spare memory cells to be substituted for future failed cells. Some part of the spare memory cells can be used to hold firmware to operate the controller and implement other features. In operation, when a host needs to read data from or write data to the flash memory, it will communicate with controller 122. If the host provides a logical address to which data is to be read/written, controller 122 converts the logical address received from the host to a physical address in the physical flash memory. (Alternatively, the host can provide the physical address). Controller 122 can also perform various memory management functions, such as, but not limited to, wear leveling (distributing write operations among memory die or blocks of the memory die to avoid wearing out specific blocks of memory that would otherwise be repeatedly written to) and garbage collection (after a block is full, moving only the valid pages of data to a new block, so the full block can be erased and reused).

The interface between controller 122 and non-volatile memory die 108 may be any suitable flash interface, such as Toggle Mode 200, 400, or 800. In some embodiments, SSD 100 includes a single channel between controller 122 and non-volatile memory die 108; however, the subject matter described herein is not limited to having a single memory channel. For example, in some memory system architectures 2, 4, 8 or more channels may exist between controller 12 and memory die 108, depending on controller capabilities. In any of the embodiments described herein, more than a single channel may exist between controller 122 and memory die 108, even if a single channel is shown in the drawings.

As depicted in FIG. 3, controller 122 includes a front end module 208 that interfaces with a host (e.g., external computing device 20 or a server 40), a back end module 210 that interfaces with the one or more non-volatile memory die 108, and various other modules that perform functions which will now be described.

The components of controller 122 depicted in FIG. 3 may take the form of a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system. For example, each module may include an application specific integrated circuit (ASIC), a Field Programmable Gate Array (FPGA), an electrical circuit, a digital logic circuit, an analog circuit, a combination of discrete circuits, gates, or any other type of hardware or combination thereof. Alternatively or in addition, each module may include software stored in a processor readable device (e.g., memory) to program a processor to perform the functions described herein.

Referring again to modules of the controller 122, a buffer manager/bus control 214 manages random access memory (RAM) 216 and controls the internal bus arbitration of controller 122. A read only memory (ROM) 218 stores system boot code. Although illustrated in FIG. 3 as located separately from the controller 122, in other embodiments one or both of the RAM 216 and ROM 218 may be located within the controller. In yet other embodiments, portions of RAM and ROM may be located both within the controller 122 and outside the controller. Further, in some implementations, controller 122, RAM 216, and ROM 218 may be located on separate semiconductor die.

Front end module 208 includes a host interface 220 and a physical layer interface (PHY) 222 that provide the electrical interface with the host or next level storage controller. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 typically facilitates transfer for data, control signals, and timing signals. In one embodiment, front end module 208 provides the single communication interface adapted to communicate with an external computing device for the controller 122 and memory die 108 of SSD 100.

Back end module 210 includes an error correction code (ECC) engine 224 that encodes the data bytes received from the host, and decodes and error corrects the data bytes read from the non-volatile memory die 108. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the non-volatile memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A flash control layer 232 controls the overall operation of back end module 210.

Additional components of SSD 100 illustrated in FIG. 3 include media management layer 238, which performs wear leveling of memory cells of non-volatile memory die 108. System 100 also includes other discrete components 240, such as external electrical interfaces, external RAM, resistors, capacitors, or other components that may interface with controller 122. In alternative embodiments, one or more of the physical layer interface 222, RAID module 228, media management layer 238 and buffer management/bus controller 214 are optional components that are not necessary in the controller 122.

The Flash Translation Layer (FTL) or Media Management Layer (MML) 238 may be integrated as part of the flash management that may handle flash errors and interfacing with the host. In particular, MML is responsible for the internals of non-volatile memory management. In particular, the MML 238 may include an algorithm in the memory device firmware which translates writes from the host into writes to the memory of a memory die 108. The MML 238 may be needed because: 1) the memory may have limited endurance; 2) the memory may only be written in multiples of pages; and/or 3) the memory may not be written unless it is erased as a block. The MML 238 understands these potential limitations of the memory which may not be visible to the host. Accordingly, the MML 238 attempts to translate the writes from host into writes into the flash memory 126. As described below, erratic bits may be identified and recorded using the MML 238. This recording of erratic bits can be used for evaluating the health of blocks and/or word lines (the memory cells on the word lines).

One embodiment of controller 122 includes data analytics module 236, which can be hardware only (e.g., electrical circuit) or software running on a processor. Data analytics module 236 manages the switching of portions of memory from I/O mode to analytics mode, downloading software (including firmware) to Controller 122, and running the downloaded software to perform data analysis on the portions of non-volatile memory in analytics mode while other portions of the SSD's non-volatile memory are in I/O mode and are performing concurrent I/O operations.

Figure 4:
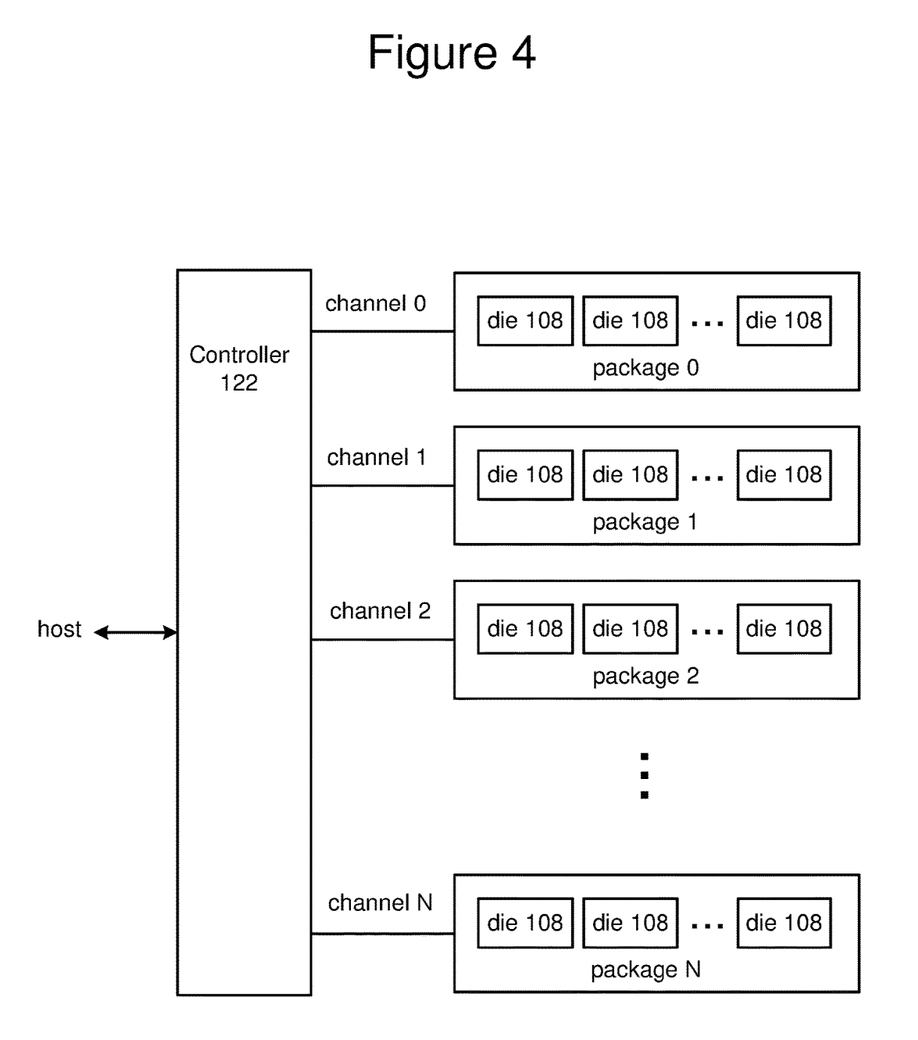
FIG. 4 is a block diagram of one example of a solid state drive.

Some embodiments of a non-volatile storage system will include one memory die 108 connected to one controller 122. However, other embodiments may include multiple memory die 108 in communication with one or more controllers 122. In one example, depicted in FIG. 4, the multiple memory die can be grouped into a set of memory packages. Each memory package includes one or more memory die 108 in communication with controller 122. FIG. 4 shows N+1 memory packages (package 0-package N), and N+1 channels (channel 0-channel N) for communication between controller 122 and the memory dies 108 of respective memory packages 0-N. In one embodiment, a memory package includes a printed circuit board (or similar structure) with one or more memory die 108 mounted thereon. In some embodiments, a memory package can include molding material to encase the memory dies 108 of the memory package. In one embodiment, a memory package can be a single memory die 108. In some embodiments, controller 122 is physically separate from any of the memory packages.

Figure 5:
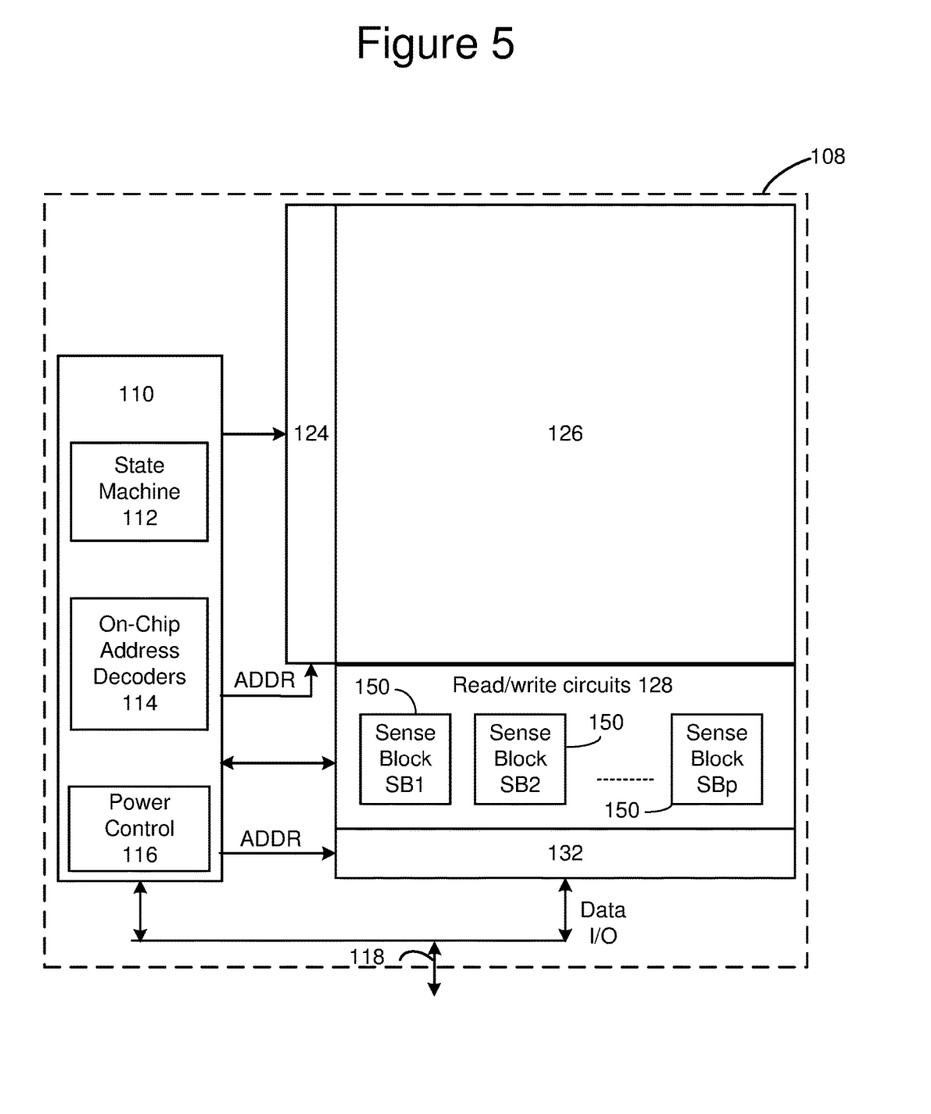
FIG. 5 is a block diagram of a non-volatile memory die.

FIG. 5 is a functional block diagram of an example memory die 108. The components depicted in FIG. 5 are electrical circuits. In one embodiment, memory die 108 includes a monolithic three dimensional memory structure 126 of memory cells (such as, for example, a 3D array of memory cells), control circuitry 110, and read/write circuits 128. In other embodiments, a two dimensional array of memory cells can be used. Memory structure 126 is addressable by word lines via a row decoder 124 and by bit lines via a column decoder 132. The read/write circuits 128 include multiple sense blocks 150 including SB1, SB2, . . . , SBp (sensing circuitry) and allow a page of memory cells to be read or programmed in parallel. Commands and data are transferred between controller 122 and memory die 108 via signal lines 118. In one embodiment, memory die 108 includes a set of input and/or output (I/O) pins that connect to lines 118.

One embodiment of memory structure 126 comprises a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. In one embodiment, memory structure 126 implements three dimensional NAND flash memory. One example of three dimensional NAND flash memory can be found in U.S. Patent Application 2016/0300619, incorporated herein by reference in its entirety. Other embodiments include two dimensional NAND flash memory, two dimensional NOR flash memory, ReRAM cross-point memories, magnetoresistive memory (e.g., MRAM), phase change memory (e.g., PCRAM), and others.

Control circuitry 110 cooperates with the read/write circuits 128 to perform memory operations (e.g., erase, program, read, and others) on memory structure 126, and includes a state machine 112, an on-chip address decoder 114, and a power control module 116. The state machine 112 provides die-level control of memory operations. In one embodiment, state machine 112 is programmable by the software. In other embodiments, state machine 112 does not use software and is completely implemented in hardware (e.g., electrical circuits). In one embodiment, control circuitry 110 includes registers, ROM fuses and other storage devices for storing default values such as base voltages and other parameters. On-chip address decoder 114 provides an address interface between addresses used by host 140 or controller 122 to the hardware address used by the decoders 124 and 132. Power control module 116 controls the power and voltages supplied to the word lines and bit lines during memory operations. It can include drivers for word lines, selection transistors, source lines, and other components. Power control module 116 may include charge pumps for creating voltages. The sense blocks 150 include bit line drivers.

Any one or any combination of control circuitry 110, state machine 112, decoders 114/124/132, power control module 116, sense blocks 150, read/write circuits 128, and controller 122 can be considered one or more control circuits that performs the functions described herein.

Multiple memory elements in memory structure 126 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors that can be used within memory structure 126. A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

In one embodiment, a three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings that traverse across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration.

One example memory system is a three dimensional memory structure that includes vertical NAND strings with charge-trapping material. Other (2D and 3D) memory structures can also be used with the technology described herein. For example, floating gate memories (e.g., NAND-type and NOR-type flash memory), ReRAM cross-point memories, magnetoresistive memory (e.g., MRAM), and phase change memory (e.g., PCRAM) can also be used.

One example of a ReRAM cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a spin valve and is the simplest structure for an MRAM bit. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCRAM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 6:
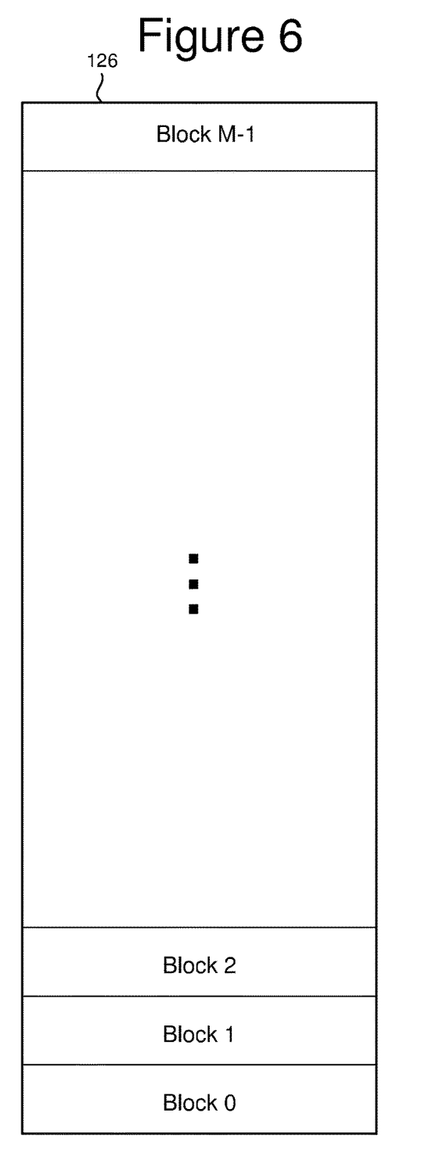
FIG. 6 is a block diagram of a non-volatile memory structure.

FIG. 6 is a block diagram depicting how a memory structure 126 of one memory die 108 is divided into M physical blocks (e.g., Block 0, Block 1, Block 2, . . . Block M−1). In some embodiments, a block of is a unit of erase. In some embodiments, a block of non-volatile storage elements share a common set of bit lines and word lines.

In systems with multiple memory die 108, the physical blocks of all of the memory die 108 of a SSD (or other non-volatile memory device) are each assigned a unique logical block address ("LBA") of a single LBA space (or logical address space) so that a host or other external computing device address each of the available blocks of the SSD using the LBA. In some embodiments, the controller 122 will perform the translation between LBA and physical block address.

Figure 7:
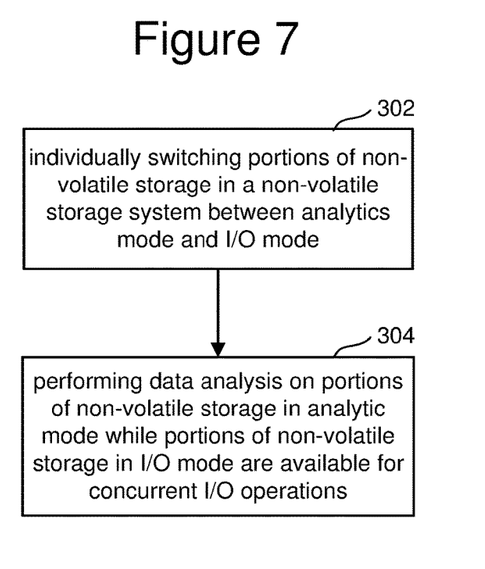
FIG. 7 is a flow chart describing one embodiment of a process for operating a solid state drive or other non-volatile storage device.

As discussed above, it is proposed to perform the data analytics in-drive. FIG. 7 is a flow chart describing one embodiment of a process for performing in-drive data analytics for a SSD or other non-volatile storage device. In step 302, the non-volatile storage system (e.g., SSD 100) individually switches portions of non-volatile storage in the non-volatile storage system between analytics mode and I/O mode. In step 304, the non-volatile storage system (e.g., SSD 100) performs data analysis on portions of non-volatile storage in analytic mode while portions of non-volatile storage in I/O mode are available for concurrent I/O operations. More details are discussed below.

Figure 8:
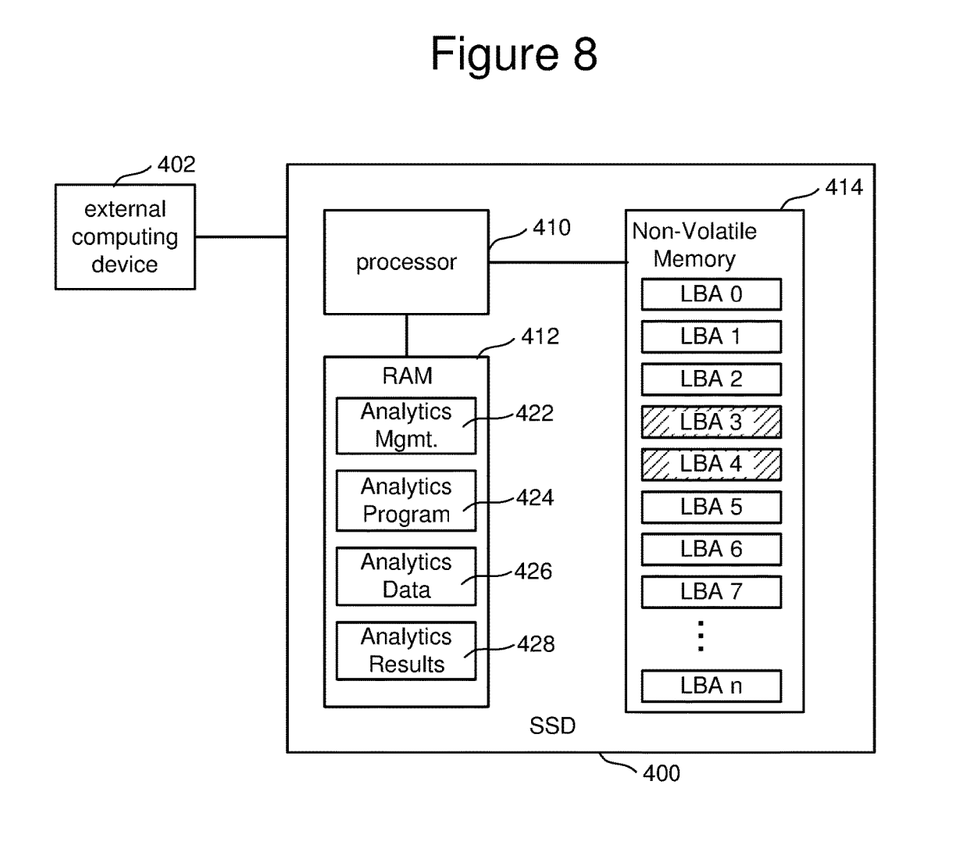
FIG. 8 is a block diagram of one example of a solid state drive.

FIG. 8 is a block diagram of one example of a solid state drive 400 that can implement the process of FIG. 7. The structure described in FIG. 8 can also be used to implement a non-volatile storage device other than an SSD. SSD 400, which can implement the architecture of FIGS. 3 and/or 4 (as well as other architectures), is in communication with external computing device 402, which can be an analytic server, application server, web server, other type of server, personal computer, network appliance, etc. SSD 400 includes a processor 410, RAM 412 and non-volatile memory 414. Processor 410 is configured to download software to program processor 410 to perform the data analytics described herein. Once programmed, processor 410 is configured to individually switch subsets of the non-volatile storage elements of non-volatile memory 414 between analytics mode and I/O mode. Processor 410 can include one processor or multiple processors. For example, processor 410 can be a multi-core processor. Processor 410 can implement controller 122 (as depicted in FIG. 3 or a different architecture). In one embodiment, a single processor (one core or multi-core) will perform the data analytics and input/output operations. In another embodiment, the processor 410 includes a first processor circuit for performing input/output operations and a second process circuit for performing data analytics. In one example implementation, processor 410 includes controller 122 for performing input/output operations and a separate analytics processor circuit for performing data analytics. In some embodiments, processor 410 includes one or more hardware accelerators specific to one or more data analytics operations. For example, a hardware accelerator can be included for common analytics operations like pattern matching.

Processor 410 is in communication with RAM 412. In one embodiment, RAM 412 is the same as RAM 216 of FIG. 3. FIG. 8 shows RAM 412 including analytics management data/code 422, analytics program 424, analytics data 426 and analytics results 428. Analytics management data/code 422 is used to program processor 410 in order to download the analytic software from external computing device 402 and communicate with external computing device 402 (including interpreting instructions from external computing device 402 and acting on those instructions). An analytics program 424 is the software downloaded from external computing device 402 that programs processor 410 to perform the data analysis described herein. Analytics data 426 is any data used by processor 410 to perform a data analysis. In some embodiments, all or a portion of the data being analyzed (that is stored in non-volatile memory 414) can be copied into RAM 412 in the analytics data 426. The results of the data analysis performed by processor 410 is stored in analytics results 428, and can be reported to external computing device 402.

Non-volatile memory 414 depicted in FIG. 8 is implemented by one or more of memory die 108. Additionally, non-volatile memory 414 can implement in one or more packages, as depicted in FIG. 4. As discussed above, the non-volatile memory in one or more memory die are grouped into physical blocks and the physical blocks across the multiple memory die are assigned logical block addresses. Thus, FIG. 8 shows n+1 logical block addresses numbered LBA 0, LBA 1, LBA 2, LBA 3, LBA 4, LBA 5, LBA 6, LBA 7, ... LBA n. Processor 410, in response to an instruction from external computing device 402, can switch one or more logical blocks (one or more logical block addresses) between analytics mode and I/O mode. For example purposes, FIG. 8 shows LBA 0, LBA 1, LBA 2, LBA 5, LBA 6, LBA 7, and LBA n with no shading to indicate that those logical blocks are in I/O mode. Logical blocks LBA 3 and LBA 4 are shaded to indicate that those two logical blocks are in analytics mode. Therefore, processor 410 can perform data analytics for the data stored in the memory cells of LBA 3 and LBA 4 while concurrently performing input/output operations for data stored in memory cells in the other logical blocks. Input/output operations include receiving data and programming that data into the non-volatile memory 414, and reading data from non-volatile memory 414 and reporting that data read to external computing device 402.

In one embodiment, processor 410 is configured to concurrently perform different data analytics for different logical blocks (or different subsets of non-volatile storage elements). As depicted in FIG. 8, one example embodiment includes processor 410, RAM 412 and non-volatile memory 414 comprising a single solid state drive. Processor 410 is configured to use a single logical address space for addressing all of the blocks of memory in non-volatile memory 414 (across all memory die 108). Additionally, as depicted in FIG. 18, processor 410 and non-volatile memory 414 communicate with any external computing device (e.g. external computing device 402) via a single communication interface adapted to communicate with external computing device 402. This single communication interface is implemented by processor 410. For example, FIG. 3 shows host interface 420 for interfacing with a host/external computing device.

Figure 9:
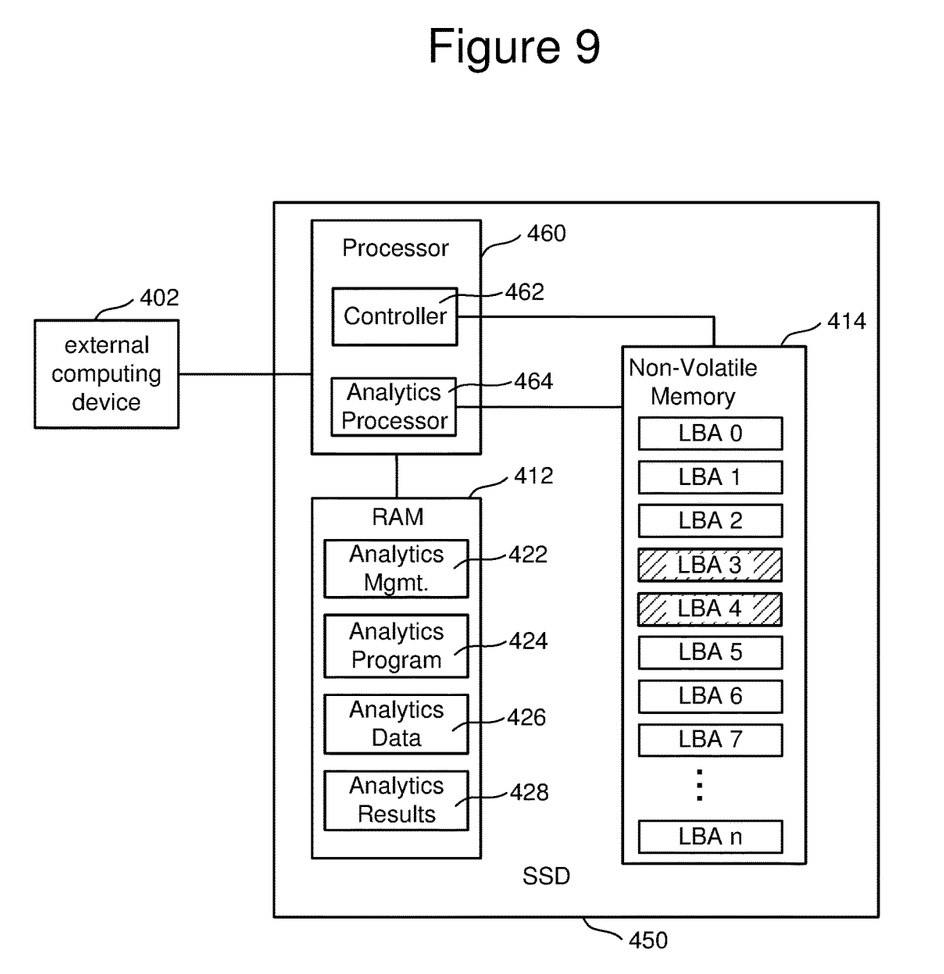
FIG. 9 is a block diagram of one example of a solid state drive.

FIG. 9 is a block diagram of another example of a solid state drive 450 that can implement the process of FIG. 7. The solid state 450 is connected to and in communication with external computing device 402. SSD 450 includes processor 460 connected to RAM 412 and non-volatile memory 414. The difference between the embodiment of FIG. 9 and the embodiment of FIG. 8 is that processor 460 of SSD 450 includes a first processor circuit for performing input/output operations and a second processor circuit (separate from the first processor circuit), for performing data analytics. More specifically, processor 460 includes controller 462 and separate analytics processor 464. Both controller 462 and analytics processor 464 are electrical circuits, and can be implemented by microprocessors, FPGAs, ASICS, custom integrated circuits, etc. In one embodiment controller 462 and analytics processor 464 are dedicated hardware with no software. In other embodiments, controller 462 and analytics processor 464 are electrical circuits that are programmed by software. In one embodiment, analytics processor 464 can include one or more hardware accelerators to perform specific data analytics operations.

Figure 10:
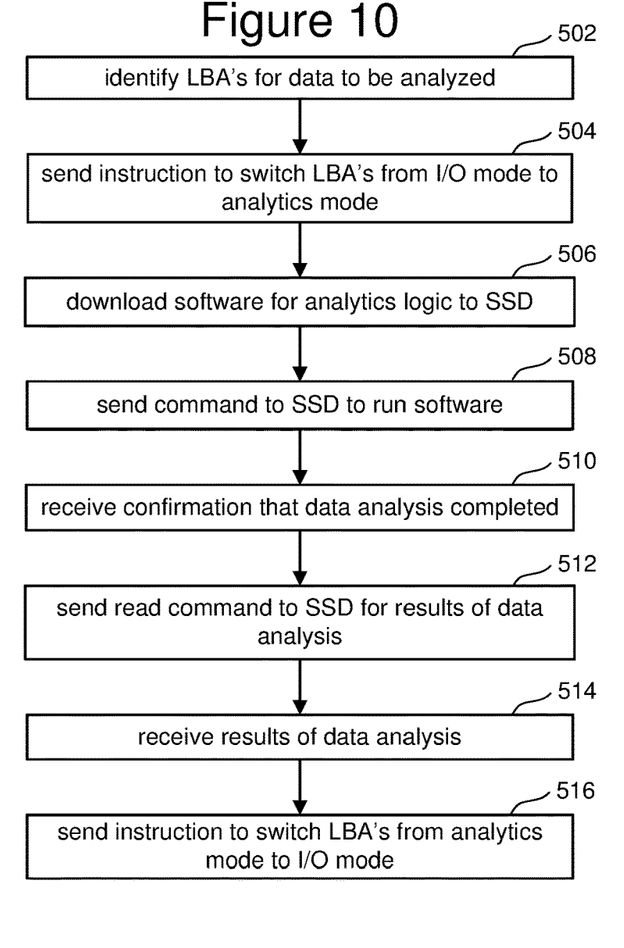
FIG. 10 is a flow chart describing one embodiment of a process for operating a server (or other external computing device) interacting with a solid state drive or other non-volatile storage device.

FIG. 10 is a flow chart describing one embodiment of a process for operating an external computing device (e.g. such as analytic server) for interacting with a solid state drive 400 or 450, or other non-volatile storage device. In step 502, the external computing device identifies one or more logical block addresses for data to be analyzed. In step 504, the external computing device will send an instruction to the SSD (or other non-volatile storage device) to switch those identified logical block addresses from I/O mode to analytics mode. Blocks in I/O mode can be programmed, erased, and read. Blocks in analytics mode cannot be programmer or erased; however, blocks in analytics modes can be used for data analysis. In step 506, the external computing device downloads analytics software to the SSD. The software downloaded will program the SSD to perform the data analysis (analytics logic). In step 508, the external computing device sends a command to the SSD to run the downloaded software. In response to that command, the SSD will run the software to configure the SSD to perform the data analysis on blocks in analytics mode (and not on blocks in I/O mode). In step 510, the external computing device receive confirmation from the SSD that the data analysis has completed. In step 512, the external computing device send a read command to the SSD to read the results of the data analysis. For example, the analytics results 428 stored in RAM 412 will be read in response to the commands in step 512. In step 514, the result of the data analysis will be transmitted from the SSD and received at the external computing device. In step 516, the external computing device sends an instruction to the SSD to switch the logical block addresses from analytics mode back to I/O mode.

Figure 11:
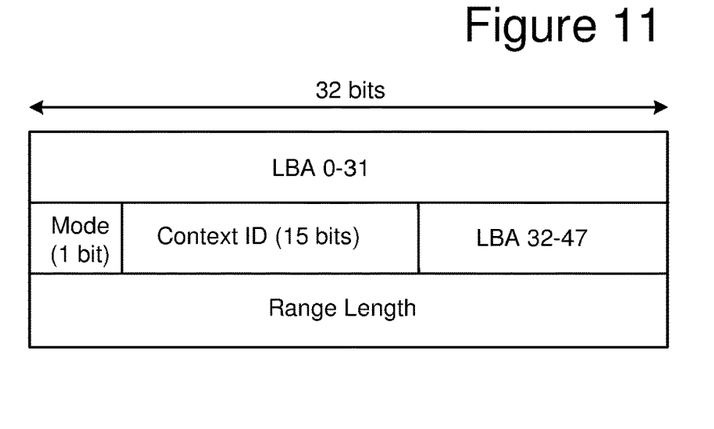
FIG. 11 is a block diagram of one example format for an instruction to switch a non-volatile storage device between I/O mode and analytics mode.

Step 504 of FIG. 10 includes sending an instruction to the SSD to switch one or more logical block addresses from I/O mode to analytics mode. FIG. 11 is a block diagram describing the form of such an instruction. In one embodiment, the instruction includes three messages that are each 32 bits wide. The first message is the first 32 bits of the logical block address (LGA 0-31). The second message includes 16 bits of the logical block address (LBA 32-47), a 15 bit Context ID and a 1 bit mode. The third message includes a 32 bit Range Length. The LBA indicates the first logical block address. The Range Length indicates how many logical block addresses need to be switched, starting from the LBA. Thus, if the Range Length is one, only the logical block address in the command is switched. If the Range Length is 10, then 10 consecutive logical block addresses starting with the logical block address in the command are switched. If the mode bit has a value of "one," then the identified one or more logical block addresses are moved from I/O mode to analytics mode. If the mode that is set at "zero," then the identified one or more logical block addresses are moved from analytics mode to I/O mode. The Context ID is a unique ID to identify a data analysis process for future commands In one embodiment, the external computing device can issue multiple commands for multiple sets of logical block addresses to be moved to analytics mode. Thus, the processor can be configured to concurrently perform different data analytics for different sets of logical block addresses. Each data analytics/set of logical block addresses will have its own Context ID. Therefore, references to the analytics results, read commands, etc. can use the Context ID to indicate the appropriate data analysis process being referred to. For example, perhaps LBA 1 and LBA 2 are moved to analytics mode to perform a first data analysis, while LBA 1000 and LBA 1001 are moved to analytics mode to perform a second sub data analysis. The system would use one context ID for LBA 1 and LBA 2, and a second Context ID for LBA 1000 and LBA 1001.

Figure 12:
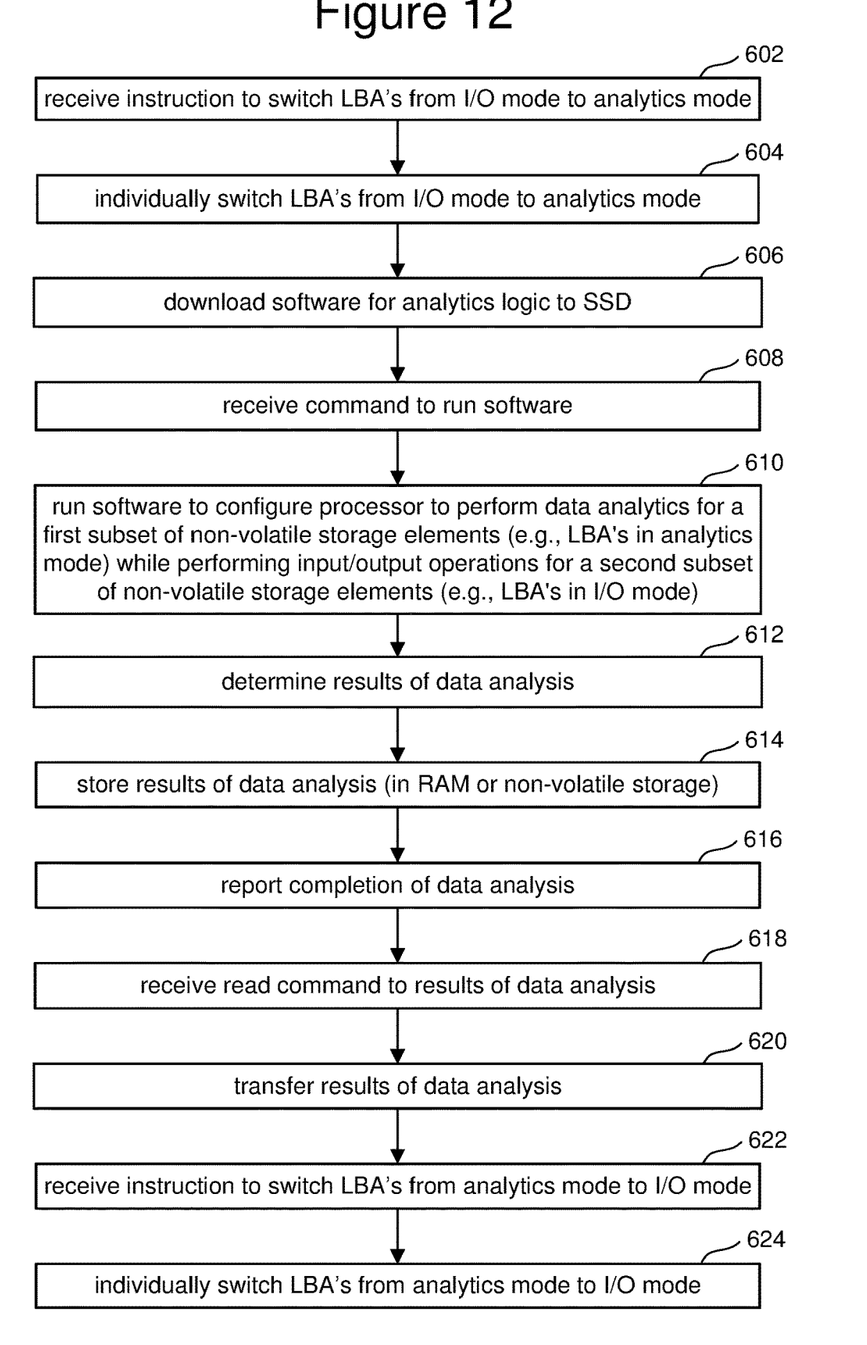
FIG. 12 is a flow chart describing one embodiment of a process for operating a solid state drive or other non-volatile storage device.

FIG. 12 is a flow chart describing one embodiment for process for operating a SSD or other non-volatile storage device. In one embodiment, the process of FIG. 12 is performed in response to the process of FIG. 10. Additionally, FIG. 12 is one example implementation of the process of FIG. 7. In step 602, the SSD (e.g., SSD 400 or 450) receives an instruction from the external computing device to switch logical block address is from I/O mode to analytics mode. In step 604, the SSD will individually switch the identified one or more logical blocks from I/O mode to analytics mode in response to the instruction received in step 602. In step 606, software is downloaded to the SSD. This software is the analytics logic to perform the data analysis requested by external computing device 402. In this manner, the external computing device can customize the data analysis performed by the SSD. The downloaded software can be stored as the analytics program 424 of RAM 412. Alternatively, the analytics software can be stored in the non-volatile memory. In step 608, the SSD receives the command to run the downloaded software. In step 610, the SSD runs the downloaded software to configure the processor (processor 410 or processor 460) to perform the data analytics for a first subset of the non-volatile storage elements (e.g., logical block addresses in analytics mode) while performing input/output operations for a second subset of non-volatile storage elements (e.g., logical block addresses in I/O mode). For example, looking back at FIG. 9, while processor 460 performs data analysis on the date stored in LBA 3 and LBA 4, processor 460 can also be receiving instructions for and programming LBA 0.

In step 612, SSD determines the results of the data analysis. In step 614, the results of the data analysis are stored. For example, the results can be stored as analytic results 428 of RAM 412. Alternatively, the results can be stored in a non-volatile storage. In step 616, the SSD reports the completion of the data analysis to the external computing device that sent the instruction in steps 602 and 608. In step 618, the SSD receives a read command from the external computing device (see step 512 of FIG. 10). In step 620, the SSD transfers the results of the data analysis (transfer analytics results 428) to the external computing device in response to the read command of step 618. In step 622, SSD receivex instructions to switch the logical block addresses from analytics mode back to I/O mode. In step 624, in response to the instruction of step 622, the SSD will individually switches logical blocks from analytics mode back to I/O mode.

In one set of embodiments, an SSD or other non-volatile storage device can be divided into multiple virtual drives such that each virtual drive can be configured to communicate with a different entity (e.g. different user, different operating system, etc.). In these embodiments, the processor (e.g., processor 410 or processor 460) can be configured to individually switch logical block addresses (or other subsets of non-volatile storage elements) in each virtual drive between analytics mode and I/O mode. Thus a portion of a virtual drive can be in analytics mode while another portion of the virtual drive can be in I/O mode. In another embodiment, an entire virtual drive can be in analytics mode while another entire virtual drive can be in I/O mode.

Figure 13:
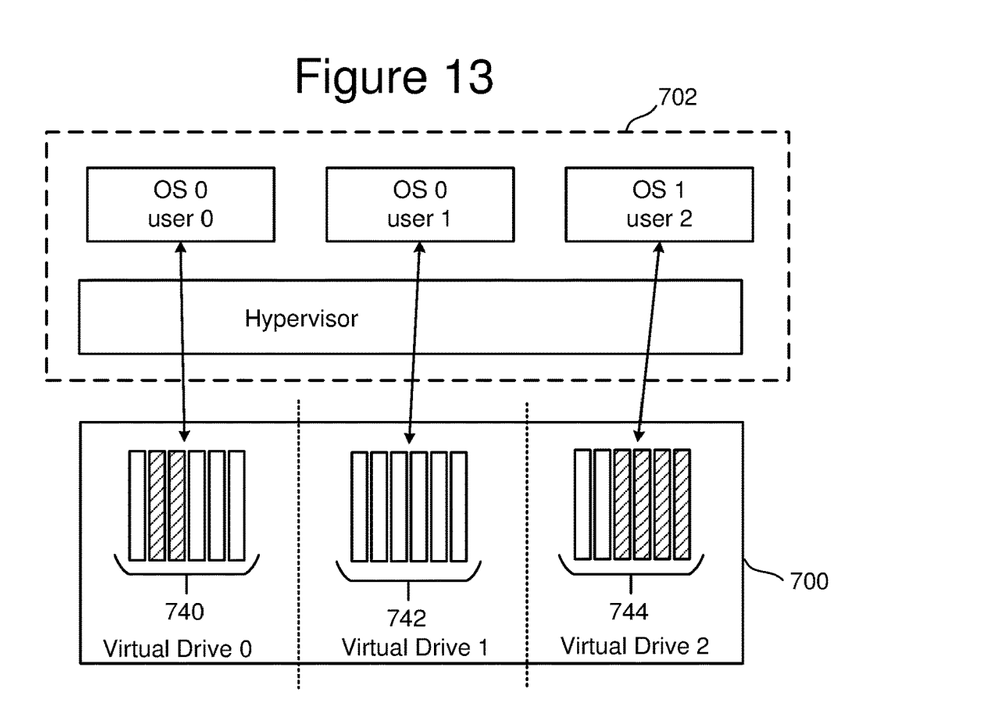
FIG. 13 is a block diagram of one example of a solid state drive divided into multiple virtual drives.

FIG. 13 is a block diagram of one example of a SSD divided into multiple virtual drives. For example, FIG. 13 shows SSD 700 which can be the same structure of any of the solid state drives discussed above. FIG. 13 shows SSD 700 divided into virtual drive 0, virtual drive 1 and virtual drive 2. Although three virtual drives are depicted in FIG. 13, other embodiments can include less than or more than three virtual drives. In the example of FIG. 13, SSD 700 is in communication with external computing device 700. In this example, external computing device 700 uses Hypervisor as software to allow multiple operating systems to run on a single server. Hypervisor software is well-known in the art. Other software can be used to implement multiple operating systems on a single server or otherwise create virtual systems on a computer. In the example of FIG. 13, two operating systems are implemented, OS 0 and OS 1. FIG. 13 also shows that there are two users using OS 0: user 0 and user 1. User 2 is depicted as using OS 1. OS 0 and OS 1 can be any operating system known in the art. In one embodiment, external computing device 702 includes three partitions, one for each user. In other embodiments, external computing device 702 can include two partitions, one for each operating system. Each user (via Hypervisor) accesses a different virtual drive. For example, user 0 can access virtual drive 0, user 1 accesses virtual drive 1 and user 2 accesses virtual drive 2. Thus, in one embodiment, different virtual drives can be in communication with different operating systems.

Each of the virtual drives includes a set of logical blocks. For example, virtual drive 0 includes logical blocks 740, virtual drive 1 includes logical blocks 742, and virtual drive 2 includes logical blocks 744. For example purposes only, logical blocks that are shaded are assumed to be in analytics mode and logical blocks that are not shaded are in I/O mode. Thus, the processor (e.g. processor 410 or processor 460) of SSD 700 is configured to individually switch logical blocks (or other subsets of non-volatile storage) in each of the virtual drives between analytics mode and I/O mode. For a same virtual drive, the processor is configured to perform data analytics for a subset of logical blocks (or other subsets of non-volatile storage) in analytics mode while performing input/output operations for other logical blocks (or other subsets of non-volatile storage elements) in I/O mode. In another embodiment, the processor is configured to perform data analytics for virtual drives in analytics mode, while concurrently performing input/output operations for virtual drives in I/O mode.

Figure 14:
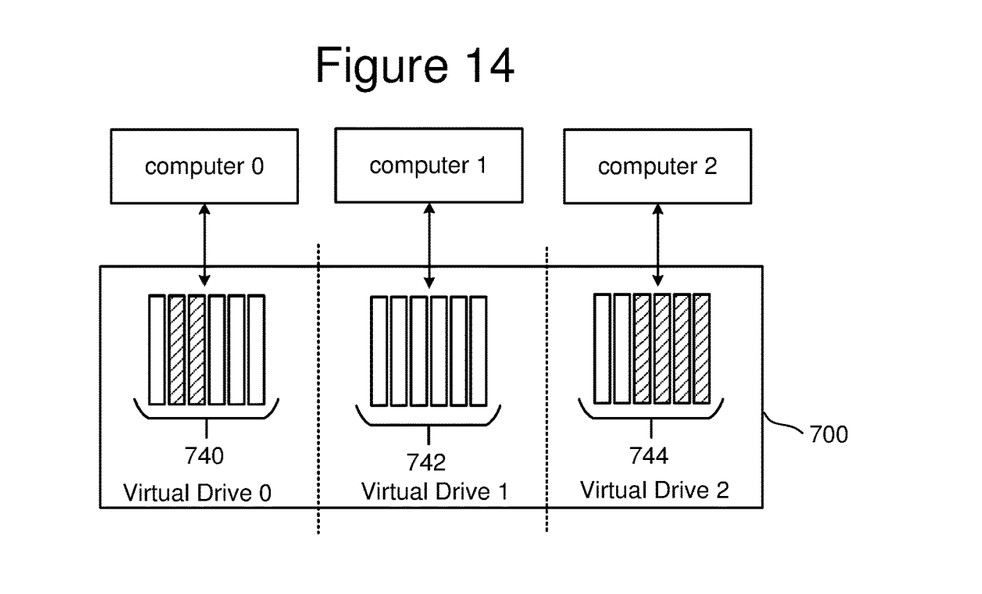
FIG. 14 is a block diagram of one example of a solid state drive divided into multiple virtual drives.

FIG. 14 is a block diagram depicting solid state drive 700 (with its multiple virtual drives) in communication with three separate computers: computer 0, computer 1 and computer 2. In this example, computer 0 is in communication with and operating virtual drive 0, computer 1 is in communication with and operating virtual drive 1, and computer 2 is in communication with and operating virtual drive 2. Computer 0, computer 1 and computer 2 can be using the same type of operating system or different types of operating systems. Even when computers 0, 1 and 2 are using the same type of operating system, they are each different instances of an operating system and thus considered different operating systems. Thus, SSD 700 has a set of virtual drives with each virtual drive communicating with a different external computing device and a different operating system SSD 700 is one example of non-volatile storage device configured to operate as multiple of virtual drives, with each virtual drive comprising multiple logical groups of memory. SSD 700 can be implemented according to any of FIG. 3, 4, 5, 8 or 9. The processor of the SSD can be used to implement the virtual drives, including operating the different virtual drives in response to communication with the different computation entities (e.g. different computers, different operating systems, different instances of operating systems etc.). As described above, the processors of the SSD are used to perform the in-drive analytics for a first logical group of memory in a first virtual drive while providing for concurrently performed I/O operations for memory in the same or other virtual drives with the same SSD.

In one embodiment, an end user of any of the systems described above, can be provided with a cross-compiler tool and application program interface ("API") to build analytics software for native execution inside an SSD implementing the technology described herein. That API will allow the analytics software to read data from any of the logical blocks, (optionally) dump that data read into a temporary buffer for analytics processing, execute the analytics logic on the data, and store analytics results in the appropriate portions of the SSD RAM such that the analytics results can be retrieved by an external computing device.

One embodiment includes a non-volatile storage device comprising a plurality of non-volatile storage elements and a processor connected to the non-volatile storage elements. The processor is configured to perform data analytics for a first subset of non-volatile storage elements while performing input/output operations for a second subset of non-volatile storage elements.

One embodiment includes a method of operating a non-volatile storage comprising individually switching portions of non-volatile storage in a non-volatile storage system between analytics mode and I/O mode and performing data analysis on portions of non-volatile storage in analytics mode while portions of non-volatile storage in I/O mode are available for concurrent I/O operations.

One embodiment includes a solid state drive comprising non-volatile storage configured to operate as multiple virtual drives each comprising multiple logical groups of memory and means for operating different virtual drives in response to communication with different computational entities including means for performing in-drive data analytics for a first logical group of memory in a first virtual drive while providing for concurrently performed I/O operations for other virtual drives. In one embodiment, the means for performing in drive data analytics includes means for performing data analytics for the first logical group of memory in the first virtual drive while concurrently performing input/output operations for a different logical group of memory of the first virtual drive.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A method of operating a solid state drive, comprising:
   individually switching physical blocks of non-volatile memory cells of the solid state drive between operating in analytics mode and operating in I/O mode; and
   performing data analysis inside the solid state drive on data stored in a first physical block of non-volatile memory cells operating in analytics mode while concurrently performing I/O operations for other physical blocks of non-volatile memory cells operating in I/O mode.

2. The method of claim 1, further comprising:
   downloading software on to the solid state drive, the solid state drive runs the software to perform the data analysis.

3. The method of claim 1, wherein:
   the solid state drive is divided into at least two virtual drives;
   the two virtual drives communicate with different operating systems;
   the individually switching physical blocks of non-volatile storage includes individually switching one or more blocks of non-volatile storage in one of the virtual drives between analytics mode and I/O mode; and the performing data analysis comprises performing data analysis for a first virtual drive while concurrently performing I/O operations for a second virtual drive.

4. A solid state drive, comprising:

non-volatile storage configured to operate as multiple virtual drives each comprising multiple logical groups of memory, each of the multiple virtual drives corresponds to physical blocks of memory in the solid state drive; and means for operating different virtual drives in response to communication with different computational entities including means for performing in-drive data analytics for data stored in a first logical group of memory in a first virtual drive of the solid state drive while concurrently performing an I/O operation for another virtual drive of the solid state drive.

5. The solid state drive of claim 4, wherein:

the means for performing in-drive data analytics includes means for performing data analytics for the first logical group of memory in the first virtual drive while concurrently performing I/O operations for a different logical group of memory of the first virtual drive.

6. A non-volatile storage device, comprising:

a communication interface configured to communicate with a computing device that is external to the non-volatile storage device;

a plurality of non-volatile storage elements arranged in physical subsets of non-volatile storage elements, all of the physical subsets of non-volatile storage elements include a unique address in a single address space, each of the physical subsets of non-volatile storage elements are configured to be individually switched between operating in analytics mode and operating in I/O mode such that each of the physical subsets of non-volatile storage elements can be operated in I/O mode and then switched to be operated in analytics mode and then switched to be operated in I/O mode; and a processor connected to the non-volatile storage elements and the communication interface, the processor is configured to communicate with the computing device via the communication interface, the processor is configured to perform data analytics inside the non-volatile storage device for first data stored in a first subset of the physical subsets of non-volatile storage elements that is in analytics mode while concurrently performing input/output operations for a second subset of the physical subsets of non-volatile storage elements that is in I/O mode based on second data communicated with the computing device via the communication interface.

7. The non-volatile storage device of claim 6, wherein:
the processor is configured to download software to program the processor to perform the data analytics.

8. The non-volatile storage device of claim 6, wherein:
the physical subsets of non-volatile storage elements are physical blocks of non-volatile storage elements each of which can be in I/O mode and each of which can be in analytics mode.

9. The non-volatile storage device of claim 8, wherein:
physical blocks in I/O mode can be programmed and erased; and
physical blocks in analytics mode cannot be programmed or erased.

10. The non-volatile storage device of claim 6, wherein:
the plurality of non-volatile storage elements are divided into multiple virtual drives;
each virtual drive is configured to communicate with a different entity; and
the processor is configured to individually switch physical subsets of the non-volatile storage elements in each of the virtual drives between analytics mode and I/O mode, for a same virtual drive the processor is configured to perform data analytics inside the non-volatile storage device for the first data stored in the first subset of the physical subsets of non-volatile storage elements that is in analytics mode while concurrently performing input/output operations for the second subset of the physical subsets of non-volatile storage elements that is in I/O mode.

11. The non-volatile storage device of claim 6, wherein:
the plurality of non-volatile storage elements are divided into multiple virtual drives;
each virtual drive is configured to communicate with a different entity; and
the processor is configured to individually switch virtual drives between analytics mode and I/O mode, the processor is configured to perform data analytics for a first virtual drive in analytics mode while concurrently performing an input/output operation for a second virtual drive in I/O mode.

12. The non-volatile storage device of claim 6, wherein:
the processor is configured to concurrently perform different data analytics for different physical subsets of the non-volatile storage elements.

13. The non-volatile storage device of claim 6, wherein:
the processor and the non-volatile storage elements comprise a single solid state drive, the processor is configured to perform the data analytics for the first data inside the solid state drive.

14. The non-volatile storage device of claim 6, wherein:
the processor is configured to switch a particular physical subset of non-volatile storage elements to I/O mode, program data to the particular physical subset of non-volatile storage elements in I/O mode, switch the particular physical subset of non-volatile storage elements from I/O mode to analytics mode, and perform data analytics inside the non-volatile storage device on the data programmed in the particular physical subset of non-volatile storage elements in analytics mode.

15. The non-volatile storage device of claim 6, wherein:
the processor is configured to switch each of the physical subsets of non-volatile storage elements between operating in analytics mode and operating in I/O mode.

16. The non-volatile storage device of claim 6, wherein:
the processor includes a first processor circuit for performing input/output operations and a second processor circuit for performing data analytics.

17. The non-volatile storage device of claim 6, wherein:
the processor includes multiple cores.

18. The non-volatile storage device of claim 6, wherein:
the processor includes a Controller and a separate analytics processor circuit.

19. The non-volatile storage device of claim 6, wherein:
the processor includes a hardware accelerator specific to a data analytics operation.

20. The non-volatile storage device of claim 6, wherein:
the plurality of non-volatile storage elements comprise a monolithic three dimensional semiconductor memory structure.

* * * * *